UNITED STATES PATENT OFFICE.

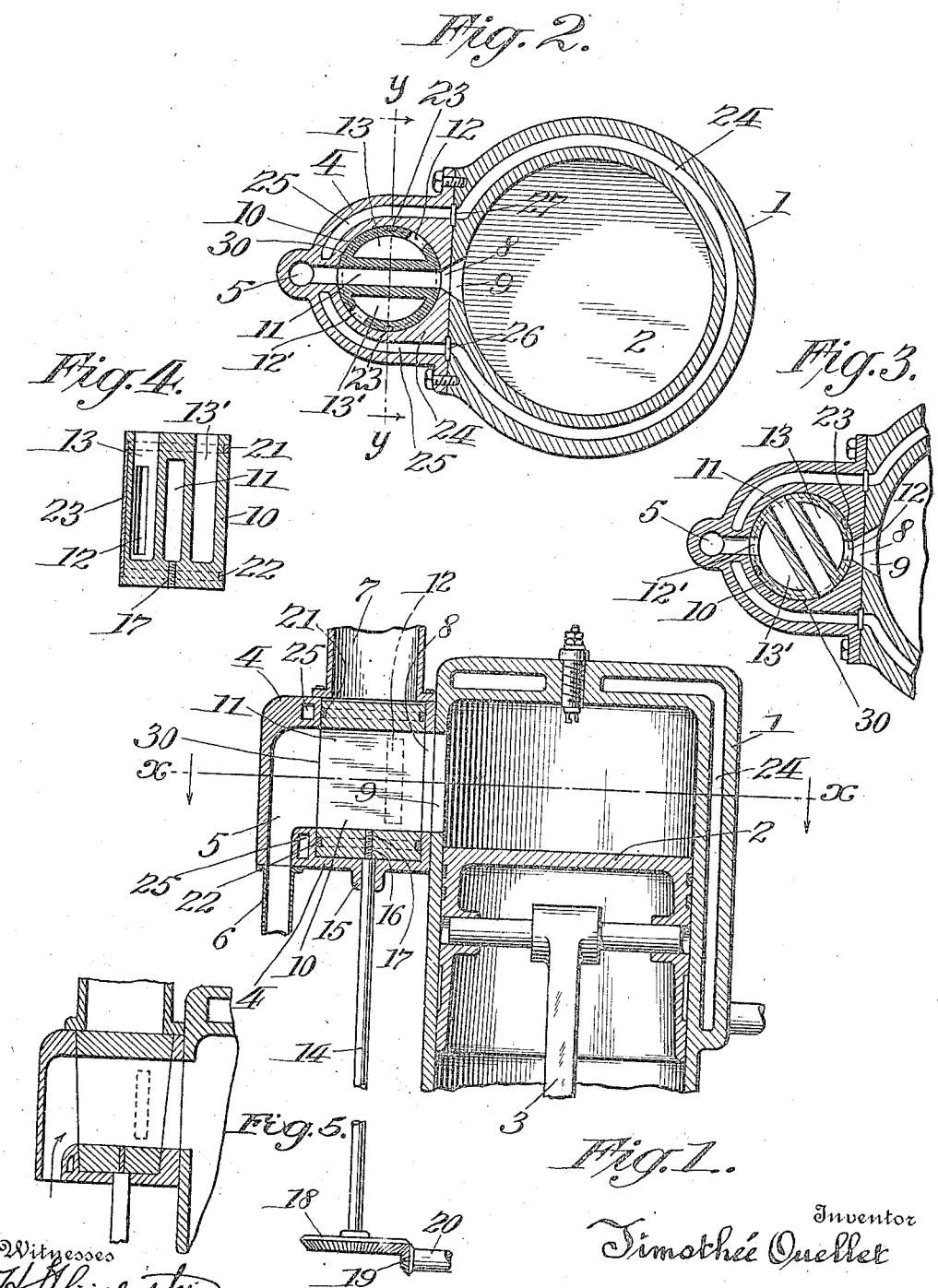

TIMOTHÉE OUELLET, OF LYSTER, QUEBEC, CANADA, ASSIGNOR TO R. GORDON GRANVILLE, OF QUEBEC, CANADA.

VALVE FOR INTERNAL-COMBUSTION ENGINES.

1,236,345.  Specification of Letters Patent.  Patented Aug. 7, 1917.

Application filed February 23, 1915. Serial No. 10,102.

*To all whom it may concern:*

Be it known that I, TIMOTHÉE OUELLET, a subject of the King of Great Britain, residing at Lyster, county of Megantic, Province of Quebec, Dominion of Canada, have invented certain new and useful Improvements in Valves for Internal-Combustion Engines, of which the following is a specification, reference being had therein to the accompanying drawing.

My invention relates to internal combustion engines and more particularly to the valve mechanism thereof.

It has for its object the provision of a simple and efficient valve mechanism of the rotary type, simple and economical in its operation and maintenance.

Other objects of my invention will appear hereinafter.

My invention is illustrated in the accompanying drawings, in which:—

Figure 1 is a vertical transverse cross section of a portion of an internal combustion engine equipped with my improved valve mechanism.

Fig. 2 is a horizontal section on the line *x—x* of Fig. 1.

Fig. 3 is a fragmentary sectional view similar to Fig. 2 showing the valve in exhaust position.

Fig. 4 is a vertical transverse section of the valve itself taken on the line *y—y* of Fig. 2.

Fig. 5 is a detail sectional view showing a modified form of valve in which the plug is tapered or conical instead of cylindrical.

Referring to the various parts in detail, 1 represents the engine cylinder casting, the bore of which is fitted with the usual piston 2 and connecting rod 3. To the right of the cylinder casting 1 is mounted the valve casing 4 secured to the engine cylinder by means of bolts as shown in Fig. 2 or by any other suitable securing means. An inlet channel 5 is formed in the valve casing, the outer opening of this channel being connected through the inlet conduit 6 leading to a suitable carbureter, mixer or other suitable source of fuel supply, not shown. A suitable exhaust conduit 7 is fitted to the top of the valve casing directly over the cylindrical valve chamber 30. An opening 8 in the valve casing registers with an opening 9 in the engine cylinder casting to form a fixed duct between the valve chamber 30 and the interior of the engine cylinder. A cylindrical valve 10 is revolubly mounted in the valve chamber 30 and is provided with an inlet duct running transversely thereof and so proportioned that its extremities will substantially register with the opening 8 and the inner extremity of the inlet channel 5. The valve is also provided with exhaust openings 12 and 12' extending into exhaust chambers 13 and 13', respectively, situated on either side of the inlet channel 11 and isolated therefrom. Both of these exhaust chambers 13 and 13' are open at the top and in constant communication with the exhaust conduit 7. The valve 10 is rotated in a constant given ratio with the movement of the engine by means of the shaft 14 journaled in the box 15 at the bottom of the valve casing and in other suitable bearings as may be required according to the type of engine and not here shown. The shaft 14 is fixedly connected with the valve by means of the reduced threaded portion 16 which takes into a complementary threaded portion 17 in the valve, which method of attachment is shown merely for simplicity of illustration and may be replaced by any other well known attaching means. Rod 14 is adapted to be rotated through one complete revolution at each four revolutions of the engine shaft which, may be accomplished by any suitable reducing gear such as the bevel gear 18 carried by the shaft 14 and meshing with the bevel gear 19 carried by the engine shaft 20. The valve 10 is further provided with suitable packing rings 21, 22 countersunk in its periphery at the top and bottom and one or more packing ribs such as 23 countersunk longitudinally in the periphery of the valve. The engine cylinder and the valve casing are provided with connecting water jackets, 24 and 25, respectively, which are maintained water-tight at the juncture of the engine cylinder and valve casing by means of the gaskets 26 and 27, of soft metal or other compressible material.

In operation, the engine starting, for example, at intake, at which point the parts would be substantially in the positions shown in Fig. 1, the piston 2 moving downwardly draws in a charge from a suitable source of fuel, not shown, through the conduit 6, inlet channel 5, valve inlet channel 11 and openings 8 and 9 into the engine cylinder. At the end of the downward stroke, the engine shaft has made a half revolution and as the valve shaft 14 is geared thereto in the ratio of 1 to 4, the valve rotates one-eighth revolution or through a circumferential distance approximately equal to the sum of the widths of the opening 8 and the opening of channel 11, after which of course the valve channel opening would pass out of communication with the opening 8 which latter then becomes closed by the wall of the valve. The cylinder now being closed by the valve, the charge just taken in will be compressed on the return stroke of the piston and at the proper time ignited in the usual manner and causing the piston to make a second down stroke. These two strokes of the engine just described cause the engine shaft to make one revolution and the valve to turn through a quarter revolution or through a circumferential distance equal approximately to the distance between the adjacent edges of the opening 12' and remoter opening of the channel 11 which brings the exhaust opening 12' into communication with the cylinder opening 8—9. It is of course obvious that by varying the angular distance between these last mentioned valve openings, and by varying the width of the exhaust opening, the exhaust period may be varied in length and time of occurrence. The piston now making the second return stroke exhausts or drives out the burned charge through the exhaust opening 12' into the exhaust chamber 13' and thence out through the exhaust conduit 7, which completes the cycle. It will be noted that during this complete cycle of the engine the valve has made a half revolution, and that during the next succeeding cycle the valve will make another half revolution in which the charge will pass through the inlet channel 11 in the opposite direction while the exhaust will pass out through the other exhaust opening 12 and exhaust chamber 13 into the common exhaust conduit 7.

The relative proportion and location of the different openings in the valve and valve chamber herein shown and described are for purposes of disclosure merely and may be varied in practice according to the characteristics of the engine.

While I have herein shown a single cylinder engine, it is obvious that a single valve of this type may be used with two or more cylinders, the number being limited only by the possible number of separate pairs of openings, such as 8 and the inner opening of channel 5, around the valve chamber 30.

It is also to be noted that the valve instead of being made generally in the form of a perfect cylinder may be conical in form and the valve chamber shaped complementary thereto, for the well known purpose of taking up wear. It will be understood that in claiming a "cylindrical" or "substantially cylindrical" form, I intend to include conical and other modifications which have a long axis of rotation and a circular cross section.

Also the packing for the valve instead of being in the form of ring and rib members as herein described, may be in various other forms.

Finally it is to be understood that while I have herein illustrated and described a specific preferred embodiment of my invention I do not desire to be limited to such a specific embodiment but contemplate all such modifications as come within the spirit of the invention and fairly fall within the scope of the appended claims.

Having thus described my invention, what I claim and desire to secure by Letters Patent is:—

1. In an internal combustion engine, a valve casing with a substantially cylindrical seat, a valve fitted to said seat, said valve being provided with a transverse passage closed at the top and bottom, and longitudinal passages closed at one end of the valve, provided with ports in the cylindrical surface of the valve, and open at the other end thereof, said ports coöperating with registering ports in the casing for inlet and exhaust purposes.

2. In an internal combustion engine, a cylinder, a combined inlet and exhaust port in said cylinder, communicating with the combustion chamber therein, a valve casing with a supply duct and port in fixed relation to the cylinder port, and a substantially cylindrical valve having an inlet opening through it from side to side, and exhaust openings consisting of longitudinal passages through the cylinder on opposite sides of the walls of the transverse opening, and exhaust ports communicating with said passages through the side walls, whereby the valve being rotated, in one position connects the supply duct through its transverse opening with the inlet port of the engine, and in another position closes the inlet duct and connects the cylinder port for exhaust purposes through a lateral and longitudinal passage-way in the valve.

3. An internal combustion engine having separate inlet and exhaust passages with their axes at right angles, a single inlet port and a substantially cylindrical rotary valve with separate longitudinal and transverse passages through it acting as the valve is rotated to alternately connect the exhaust and inlet passages with the cylinder port for exhaust and for inlet purposes respectively.

4. An internal combustion engine having an inlet port and a substantially cylindrical rotary valve having a transverse inlet passage of substantially the same sectional area as the port extending through the valve, and a longitudinal passage or cavity of enlarged area open to the air or exhaust pipe at one end of the cylinder but closed at the other end and communicating with the cylinder port through a lateral opening, whereby the supply of gas for a fresh charge is drawn direct into the cylinder through a uniform passage-way, while the exhaust through the same port is expanded through an enlarged passage into the atmosphere or muffler.

5. In an internal combustion engine, a valve casing with a substantially cylindrical seat, a valve fitted to said seat, said valve being provided with a transverse passage closed at the top and bottom, and longitudinal passages closed at one end of the valve, provided with ports in the cylindrical surface of the valve, and open at the other end thereof, said ports coöperating with registering ports in the casing for inlet and exhaust purposes, and means for operating said valve comprising a shaft or spindle coaxial therewith passing through one end of the valve casing and connected to the same end of the valve, together with gears connected to the spindle and to a moving part of the engine respectively.

In testimony whereof I affix my signature in presence of two witnesses.

TIMOTHÉE OUELLET.

Witnesses:
 ARTHUR JEFFREY,
 JOSEPH BERNARET.